(12) United States Patent
Hayami et al.

(10) Patent No.: US 8,568,258 B2
(45) Date of Patent: *Oct. 29, 2013

(54) CHAIN TENSIONER

(75) Inventors: Atsushi Hayami, Osaka (JP); Osamu Yoshida, Osaka (JP); Yuji Kurematsu, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 244 days.

This patent is subject to a terminal disclaimer.

(21) Appl. No.: 13/097,468

(22) Filed: Apr. 29, 2011

(65) Prior Publication Data

US 2011/0287880 A1  Nov. 24, 2011

(30) Foreign Application Priority Data

May 21, 2010 (JP) ................................. 2010-117705

(51) Int. Cl.
  *F16H 7/08* (2006.01)
(52) U.S. Cl.
  USPC .......................................................... 474/111
(58) Field of Classification Search
  USPC ........................... 474/111, 101, 109, 110, 140
  See application file for complete search history.

(56) References Cited

U.S. PATENT DOCUMENTS

| | | | | |
|---|---|---|---|---|
| 4,772,251 | A * | 9/1988 | Goppelt et al. | 474/101 |
| 5,931,754 | A * | 8/1999 | Stief et al. | 474/109 |
| 6,935,978 | B2 * | 8/2005 | Hayakawa et al. | 474/109 |
| 7,775,921 | B2 * | 8/2010 | Izutsu et al. | 474/110 |
| 8,277,347 | B2 * | 10/2012 | Barrette et al. | 474/101 |
| 8,282,520 | B2 * | 10/2012 | Kurematsu et al. | 474/101 |
| 2007/0213152 | A1 * | 9/2007 | Yamamoto et al. | 474/109 |
| 2011/0021298 | A1 * | 1/2011 | Kurematsu et al. | 474/110 |
| 2011/0269584 | A1 * | 11/2011 | Yoshida et al. | 474/101 |
| 2011/0287880 | A1 * | 11/2011 | Hayami et al. | 474/111 |

FOREIGN PATENT DOCUMENTS

JP  2002-005251  1/2002

* cited by examiner

*Primary Examiner* — William E Dondero
*Assistant Examiner* — Robert T Reese
(74) *Attorney, Agent, or Firm* — Howson & Howson LLP

(57) ABSTRACT

In a tensioner having a ratchet mechanism composed of annular teeth on a plunger and an expansible resilient ring disposed in a groove formed in the inner peripheral surface of a plunger-accommodating hole in a tensioner housing, the rear surfaces of the annular teeth have a steep slope, and the front surfaces of the annular teeth have a gradual slope with a convex curvature such that the rate of change of the slope decreases proceeding in the direction of retraction of the plunger.

6 Claims, 15 Drawing Sheets

FIG. 4
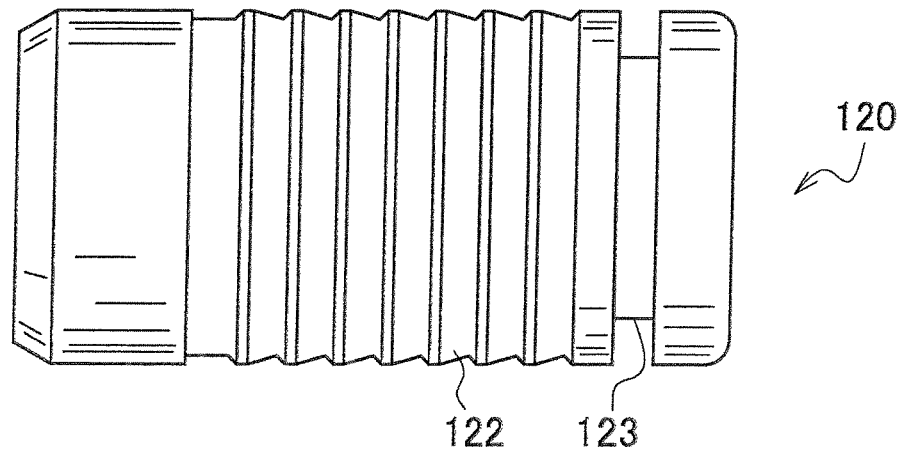
FIG. 5A
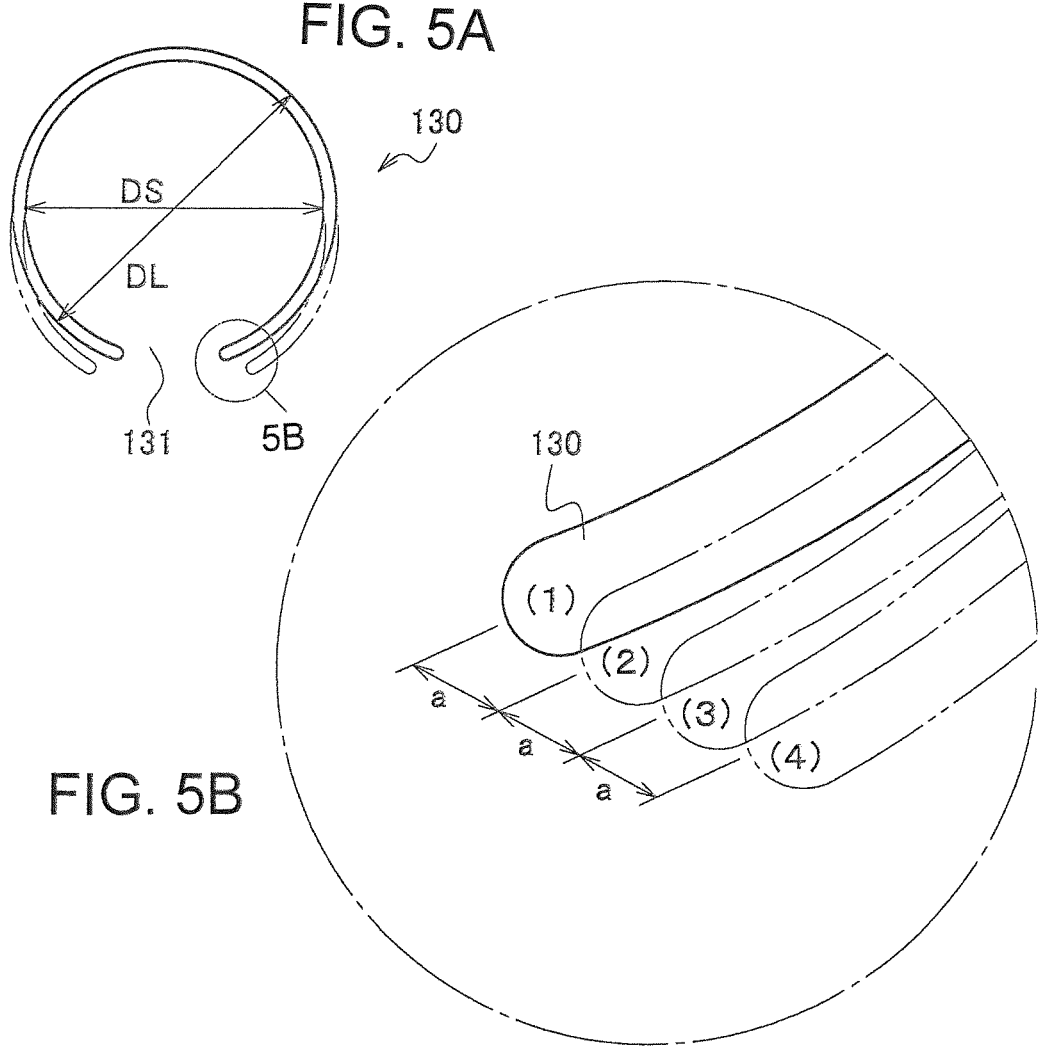
FIG. 5B

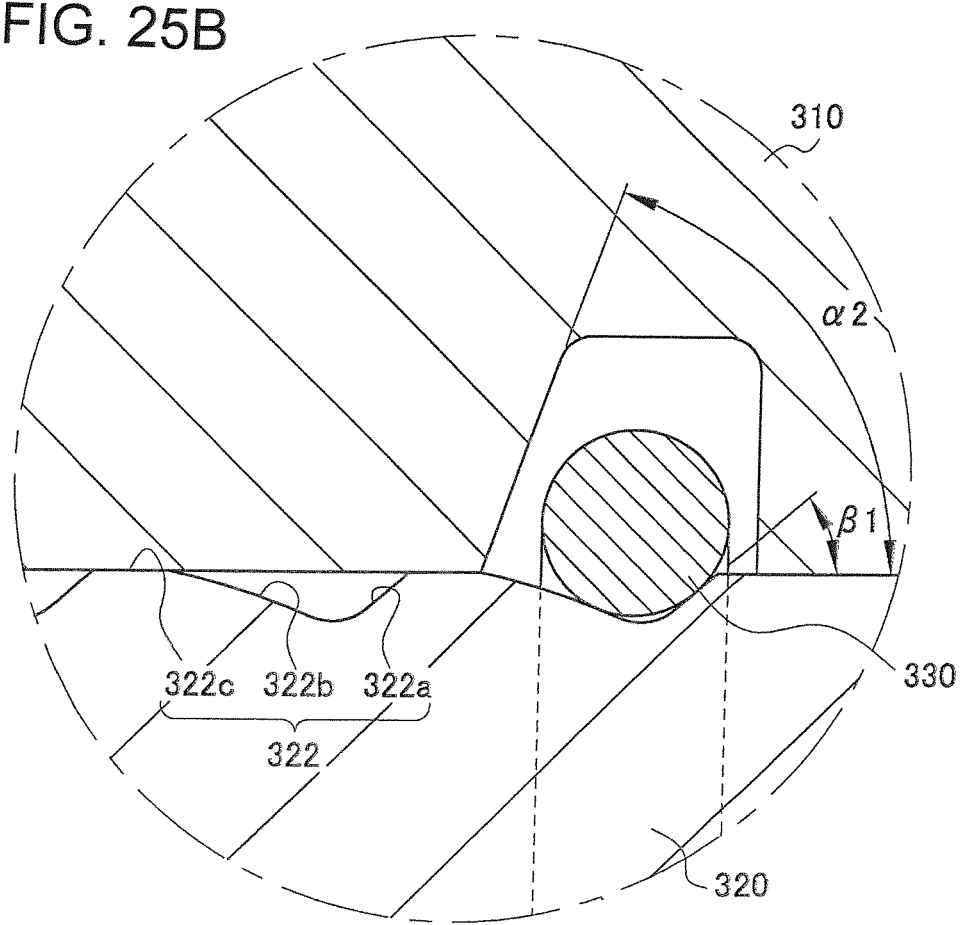
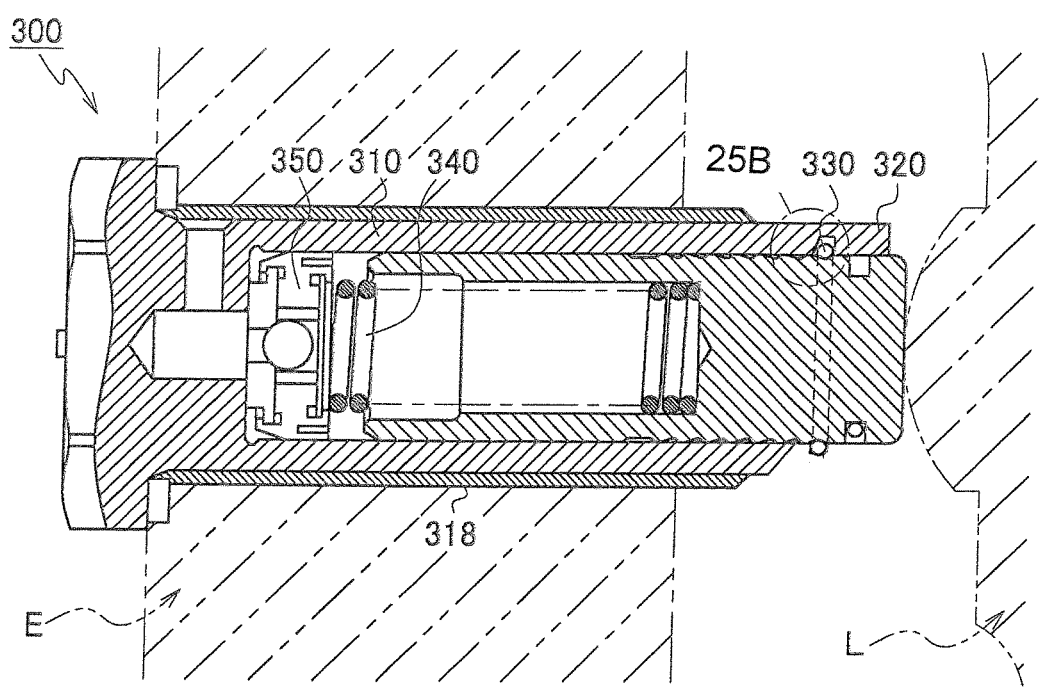
FIG. 25A
FIG. 25B

CHAIN TENSIONER

CROSS REFERENCE TO RELATED APPLICATIONS

This application claims priority on the basis of Japanese Patent Application 2010-117705, filed on May 21, 2010. The disclosure of Japanese Patent Application 2010-117705 is incorporated by reference.

FIELD OF THE INVENTION

The invention relates to a chain tensioner in which a plunger is slidable in, and protrudes from, a cylindrical plunger-accommodating hole in a tensioner housing, and is biased in the protruding direction so that it can maintain adequate tension in a traveling transmission chain.

BACKGROUND OF THE INVENTION

A typical application for a chain tensioner is the maintenance of tension in an automobile engine timing chain. In an engine timing drive, an endless transmission chain, for example, a roller chain, is driven by a crankshaft sprocket and in driving relationship with one or more camshaft sprockets. The chain travels in sliding relationship over a movable chain guide which is urged against the chain by the plunger of the tensioner in order to maintain tension in the span of the chain that travels from the crankshaft sprocket toward a camshaft sprocket.

The plunger is biased in the protruding direction at least in part by oil supplied under pressure to a high pressure oil chamber formed by the plunger and the tensioner housing. Movement of the plunger in the retracting direction is controlled by hydraulic damping effected by leakage of oil through a restricted space between the outer peripheral surface of the plunger and the cylindrical inner wall of the plunger-accommodating hole. On engine start-up, oil pressure is not yet built up in the oil chamber of the tensioner, and, if the engine has not been operated for a long time, oil in the oil chamber may be depleted. Consequently, the damping function will not take place until oil pressure has been reestablished. Until oil pressure is reestablished, the plunger can retract excessively, causing the timing drive to generate a rattling noise.

To address the aforementioned problem, it is known to provide a chain tensioner with a ratchet mechanism composed of a plurality of concave grooves around the plunger and a groove-engaging member provided in the tensioner housing. The groove-engaging member restricts movement of the plunger in the retracting direction. Such a tensioner is disclosed in laid-open Japanese Patent Application No. 3929680, published on Jan. 9, 2002.

The prior art ratchet mechanism not only restricts retracting movement of the plunger on engine start-up, but also restricts retraction of the plunger when excessive chain tension occurs during normal engine operation, due to temperature changes and other causes. In this case, seizing of the plunger can occur, resulting in an increased load on the chain and the generation of excessive noise.

The problems arising from excessive chain tension during normal engine operation can be alleviated to some extent by providing for a predetermined amount of backlash in the ratchet mechanism of the tensioner. The predetermined amount of backlash is set to correspond to a presumed maximum movement of the plunger in the retracting direction caused by the excessive chain tension. However, as the amount of allowable backlash increases, the amount of rattling noise generated on engine start-up also increases.

In the prior art chain tensioner the grooves on the outer peripheral surface of the plunger have forward surfaces, i.e., surfaces facing in the direction in which the plunger protrudes, that have a gradual slope with a constant angle of inclination. These surfaces are engaged by a resilient ring, whose diameter becomes larger as a result of the force exerted by a forward groove surface. The spring modulus of the ring, however is such that the force exerted axially on the plunger to expand the resilient ring increases as the ring expands. Consequently the advancing movement of the plunger depends on the plunger position relative to the ring, the damping response of the tensioner becomes uneven, the plunger does not advance smoothly, and "flip-flop" noises are generated.

In another kind of ratchet tensioner, the member that engages ratchet teeth on the plunger is a pawl that is pivotally mounted on the tensioner housing. Because a part of the pawl extends outside the tensioner housing, the overall size of the tensioner is increased. The pawl mechanism also increases the complexity of the tension, and makes installation and removal of the tensioner more difficult. Furthermore, designing the ratchet mechanisms of these prior art chain tensioners so that their characteristics meet operating conditions requires modification of the entire tensioner, thereby increasing manufacturing costs.

SUMMARY OF THE INVENTION

A general aim of the invention is to address one or more of the aforementioned problems. Accordingly, aspects of the invention include elimination of "flip-flop" noises on engine start-up, providing for improved smoothness in the advancing movement of the plunger, simplification and downsizing of the tensioner structure, prevention of seizing of the plunger by permitting movement of the plunger in the retracting direction when chain tension becomes excessive, reducing excessive noise, and simplifying installation, removal and maintenance of the tensioner.

The chain tensioner in accordance with the invention comprises, a tensioner housing, a plunger, a resilient ring, and a plunger-biasing spring. The housing has a cylindrical plunger-accommodating hole having an opening at one end thereof. The plunger is slidable in the plunger-accommodating hole and protrudes therefrom through the opening. The plunger is movable in the plunger-accommodating hole both in a protruding direction and in a retracting direction opposite to the protruding direction. An annular circumferential groove is formed in the inner peripheral surface of the plunger-accommodating hole adjacent the opening. The resilient ring is retained in the annular circumferential groove and is radially expansible and contractible therein between a radially contracted condition and a radially expanded condition. The plunger-biasing spring urges the plunger in the protruding direction.

A plurality of annular rack teeth is formed on the outer peripheral surface of the plunger. The rack teeth are spaced from one another along the protruding direction. The annular circumferential groove of the plunger-accommodating hole comprises a first ring-engaging wall facing in the retracting direction of the plunger, and a second ring-engaging wall facing in the protruding direction. Each rack tooth has a steeply sloping rear side facing in the retracting direction and a gradually sloping front side facing in the protruding direction. The resilient ring, when in its radially contracted condition can simultaneously engage a steeply sloping rear side of a rack tooth and a gradually sloping front side of an adjacent rack tooth. The angle of inclination of the second ring-engaging wall surface is greater than the angle of inclination of the steeply sloping rear sides of the rack teeth. Because of the relationship between these angles of inclination, which are measured relative to the protruding direction of the plunger, the resilient ring can be prevented from crossing over the tip of a rack tooth when a moderate load in the retracting direction is applied to the plunger on engine start-up, but can cross over the tip of a rack tooth by expansion of the ring when a load greater than the moderate load is applied to the plunger in the retracting direction when chain tension becomes excessive.

The gradually sloping front sides of the rack teeth have a convex curvature wherein the rate of increase in their diameters with respect to the retracting direction of the plunger decreases, proceeding along the retracting direction. As a result of the convex curvature of the front sides of the rack teeth, the protruding movement of the plunger becomes more nearly uniform as the resilient ring is expanded by contact with a gradually sloping front side of a rack tooth.

The chain tensioner according to the invention has several advantages over conventional chain tensioners. First, because the ratchet mechanism comprises a resilient ring disposed within the plunger-accommodating hole, the tensioner housing can be downsized. Second, the retracting and protruding movement of the plunger can be readily adjusted for each individual tensioner by selecting the inclination angles of the annular circumferential groove in the plunger-accommodating hole and by selecting the inclination angles of the rack teeth of the plunger. Accordingly, it is a simple matter to design the ratchet mechanism to satisfy various conditions of operation, and manufacturing costs are reduced. Third, the resilient ring can be prevented from crossing over the rack tooth tips in the retracting direction on engine start-up, but permitted to cross over the rack tooth tips portion as the resilient ring expands when chain tension becomes excessive during engine operation. Accordingly, it is possible to prevent seizing of the plunger and to reduce the excessive noise, sometimes referred to as a "beat note," generated when the chain tension becomes excessive. Fourth, the convex shape of the forward surfaces of the rack teeth allows the plunger to protrude smoothly, thereby eliminating the "flip-flop" noise generated on engine start-up.

In a preferred embodiment, each rack tooth has a cylindrical tip surface having a uniform diameter interposed between its sloping front and rear sides. Accordingly, the pressure acting against the inner peripheral surface of the plunger-accommodating hole is reduced, and smooth advancing and retracting movement of the plunger can be achieved.

The resilient ring can be a C-ring that can readily expand and contract within the annular circumferential groove. Accordingly, the ratchet structure is simplified. Moreover, the C-ring obviates radially protruding ratchet parts, allowing the tensioner housing to be downsized. In addition, the ring can be selected for the desired resilience so that manufacturing costs can be reduced.

The resilient ring can also be in the form of an annular ring provided with lever portions extending radially outward therefrom. This embodiment has the advantages of the above-described C-ring. In addition, man operator can easily enlarge and reduce the annular ring manually by manipulation of the lever portions, and thereby more readily install, remove, and maintain the ring.

The tensioner housing can include a threaded outer circumferential surface, whereby the tensioner can be mounted by engaging its threads with mating threads formed in an opening in a wall of an engine. The utilization of a resilient ring in the ratchet mechanism, and the incorporation of threads on the outside of the tensioner housing allow a significant downsizing of the tensioner as well as simple assembly, installation, and removal for maintenance.

BRIEF DESCRIPTION OF THE DRAWINGS

FIG. 4 is a side elevational view of the plunger of the chain tensioner of FIG. 2;

FIG. 5A is an elevational view of a resilient ring used in the first embodiment, and FIG. 5B is an enlarged auxiliary view of a part of the resilient ring, designated "5B" in FIG. 5A, and illustrating the expansion and contraction of the ring;

FIG. 5B is an enlarged auxiliary view of a part of the tensioner, designated "6B" in FIG. 6A, showing details of the ratchet mechanism of the tensioner;

FIGS. 25A and 25B are, respectively, a cross-sectional view of a chain tensioner according to a third embodiment of the invention, and an enlarged auxiliary view of a part of the chain tensioner, designated "25B" in FIG. 25A, showing details of the relationship between the resilient ring and the plunger.

DETAILED DESCRIPTION OF THE PREFERRED EMBODIMENTS

Figure 1:
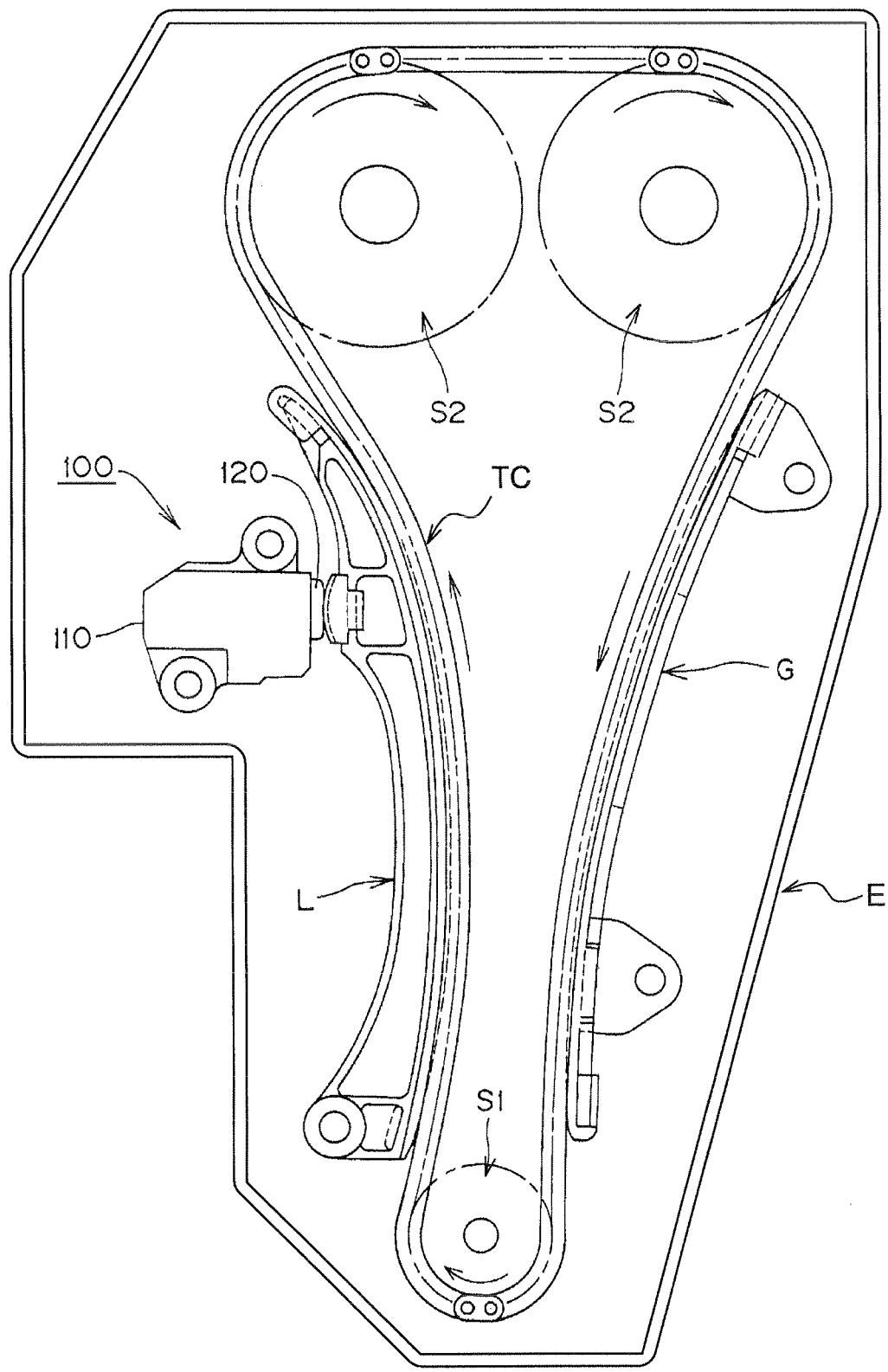
FIG. 1 is a schematic front elevational view of an engine timing drive incorporating a chain tensioner according to the invention.

As shown in FIG. 1, a chain tensioner 100 is used in the timing drive of an engine E. The timing drive comprises an endless chain TC, driven by a crankshaft sprocket S1, and in driving relationship with two camshaft sprockets S1 and S2. A pivoted tensioner lever L, in sliding contact with a span of the chain TC that travels from sprocket S1 to sprocket 22, guides and maintains adequate tension in the chain. The tensioner lever L is pivoted on the engine E and biased into engagement with the chain by a protruding plunger of the chain tensioner 100. A stationary guide G, fixed to the engine E, is in sliding contact with a span of the chain that travels from sprocket S2 toward sprocket S1.

Figure 2:
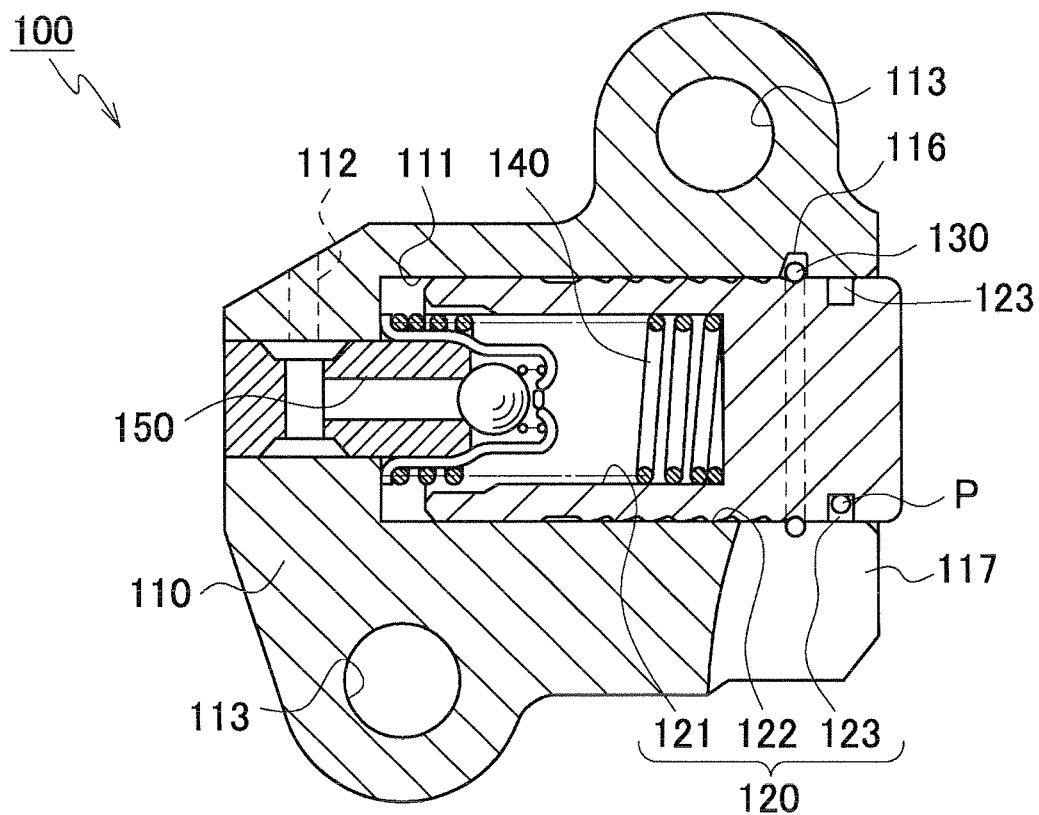
FIG. 2 is an axial cross-section of a chain tensioner according to a first embodiment of the invention.
Figure 3:
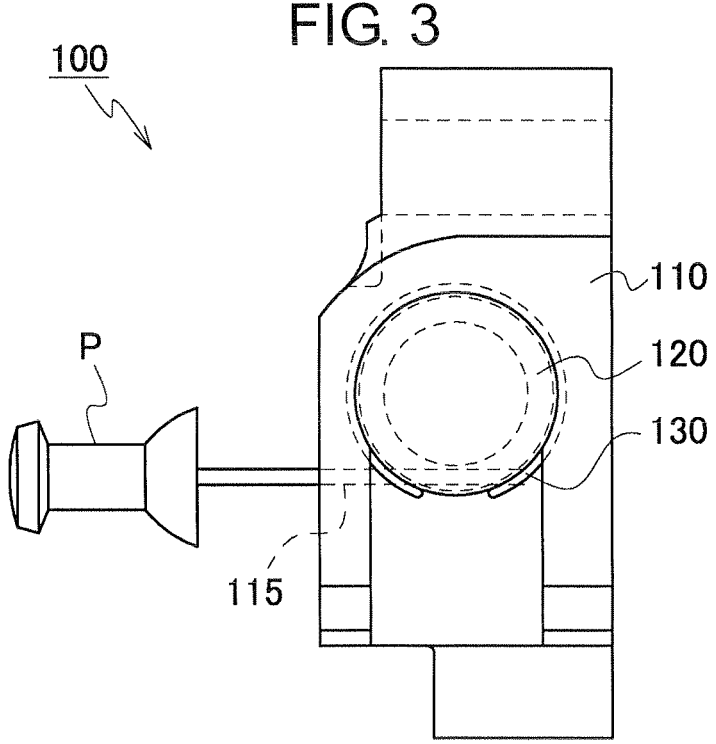
FIG. 3 is a front elevational view of the chain tensioner of the first embodiment.

As shown in FIGS. 2 and 3, the tensioner 100 comprises a housing 110, a hollow cylindrical plunger 120, slidable in and protruding from an opening at the end of a plunger-accommodating hole 111 in the housing. The tensioner also comprises a resilient C-ring 130, a plunger-biasing spring 140, in the plunger-accommodating hole, for urging the plunger 120 in its protruding direction, and a check valve 150, which allows introduction of oil through an oil supply passage 112, into a high pressure oil chamber formed by the housing and the plunger, but blocks reverse flow of oil.

In the operation of the tensioner, oil supplied under pressure through the check valve 150 damps reciprocating movement of the plunger 120 while assisting the spring 140 in biasing the plunger 120 in the protruding direction. Damping takes place by virtue of leakage of oil through a very narrow gap between the plunger and wall of the plunger-accommodating hole 112

The tensioner 100 also includes mounting holes 113 for mounting the chain tensioner 100 to an engine block, a latch pin P (shown in FIGS. 2 and 3), temporarily inserted through a pin insertion hole 115 (FIG. 3) in the housing and engaged with an annular groove 123 on the plunger, for preventing the plunger 120 from accidentally jumping out of the housing while tensioner 100 is being installed in an engine.

As shown in FIG. 5A, the resilient C-ring 130, is generally in the form of a circle having a gap 131. That is, the ring is substantially in the form of a circular arc subtending an angle greater than 180 degrees but less than 360 degree. When the resilient ring is in a relaxed condition, i.e., when no force is applied tending to expand or contract the ring, its outer diameter DL is larger than the inner diameter of the plunger-accommodating hole 111 (FIG. 2) but less than the outer diameter of the plunger 120.

The ring 130 is partly disposed in, and retained by, an annular circumferential groove 116 formed in the wall of the plunger-accommodating hole 111. The depth of groove 116 is such as to allow the ring to expand. As shown in FIG. 5B, when the ring expands, portions of the ring adjacent the gap 131 move outward relative to the center of the ring.

Figure 6B:
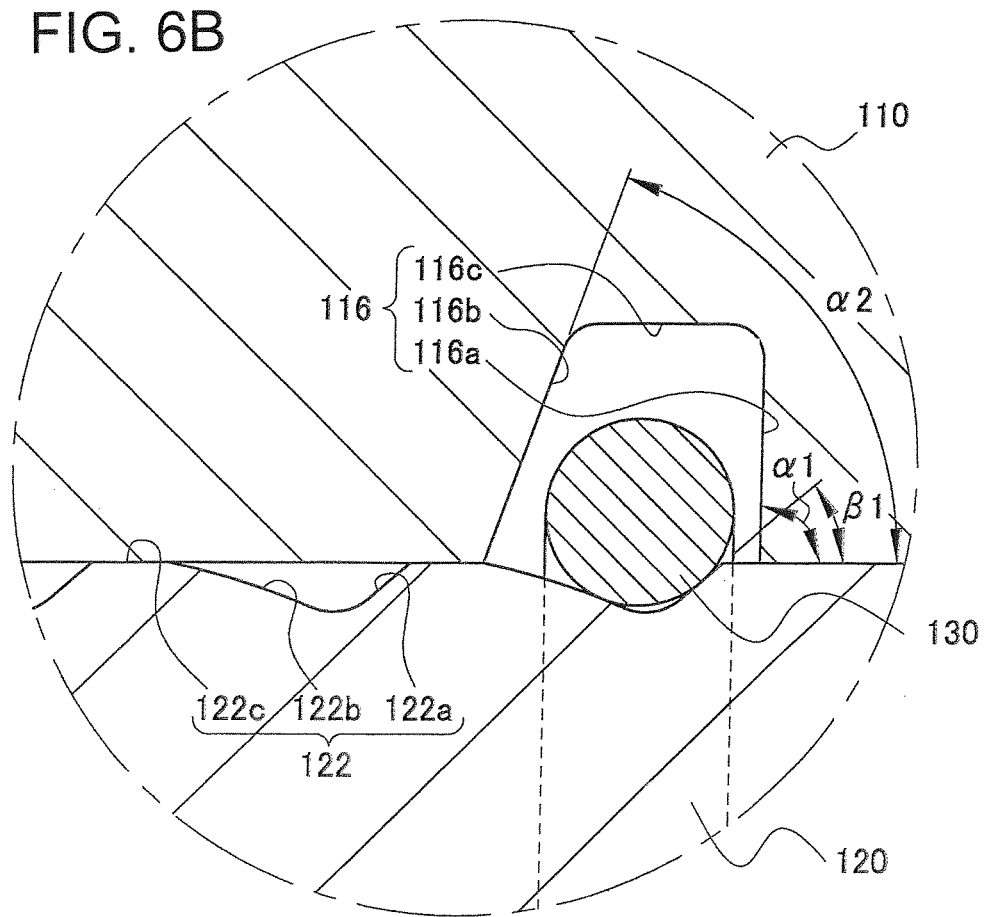
FIG. 6A is an axial cross-section of a chain tensioner according to a first embodiment.
Figure 6A:
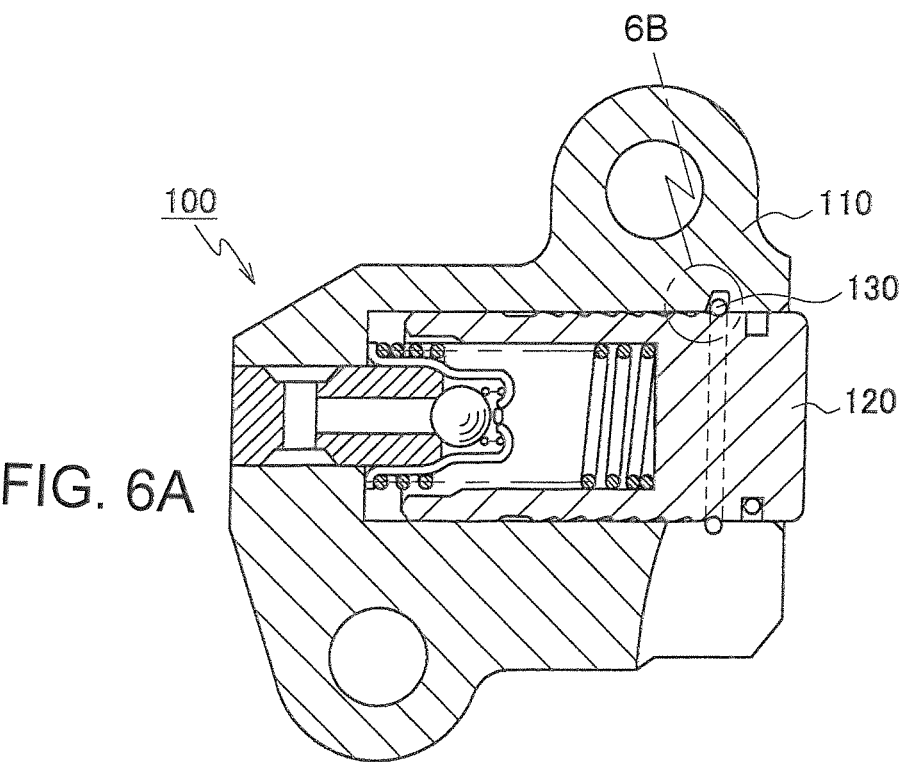

As shown in FIG. 6B, the annular circumferential groove 116 has a first ring-engaging wall 116a facing in the direction of retraction of the plunger and a second ring-engaging wall 116b facing in the direction of protrusion of the plunger. Wall 116a is a substantially planar surface to which the direction of protrusion of the plunger is perpendicular. Surface 116b, on the other hand is a frusto-conical surface, disposed at an angle $\alpha 2$ relative to the direction of protrusion of the plunger so that it faces both forward and inward toward the plunger. The groove also has an annular bottom 116c connecting surfaces 116a and 116b.

As shown in FIG. 2, the plunger 120 is formed with a hollow interior, defined by a wall 121, for receiving plunger-biasing spring i40. The plunger has a generally cylindrical shape, allowing it to slide in plunger-accommodating hole 111 of the tensioner housing 110. However, as shown in FIGS. 2 and 4, the outer peripheral surface of the plunger is provided with a plurality of annular grooves, forming annular rack teeth 122, that cooperate with the resilient C-ring 130 in groove 116 to form a ratchet mechanism for controlling retracting movement of the plunger. The plunger 120 also includes a latching groove 123 for receiving the latch pin P which extends through the pin insertion hole 115 as described above.

In the enlarged auxiliary view of FIG. 6b, it can be seen that each rack tooth 122 on the plunger 120 is composed of a relatively steep rearward-facing surface 122a which can be positioned by movement of the plunger so that it faces ring-engaging surface 116b of groove 116. Each rack teeth has a more gradually sloping forward-facing surface 122b, which can be positioned so that it faces toward surface 116a of groove 116. The forward- and rearward-facing surfaces of each rack tooth are connected by a cylindrical tip surface 122c, which has a uniform outer diameter for sliding contact with the wall of the plunger-accommodating hole.

The restriction of the movement of the plunger in the protruding and retracting directions can be determined independently by the adoption of appropriate inclination angles for the forward-facing and rearward-facing surfaces of the annular rack teeth. Accordingly, the chain tensioner can be easily designed to meet various operating conditions with reduced manufacturing costs.

Figure 7:
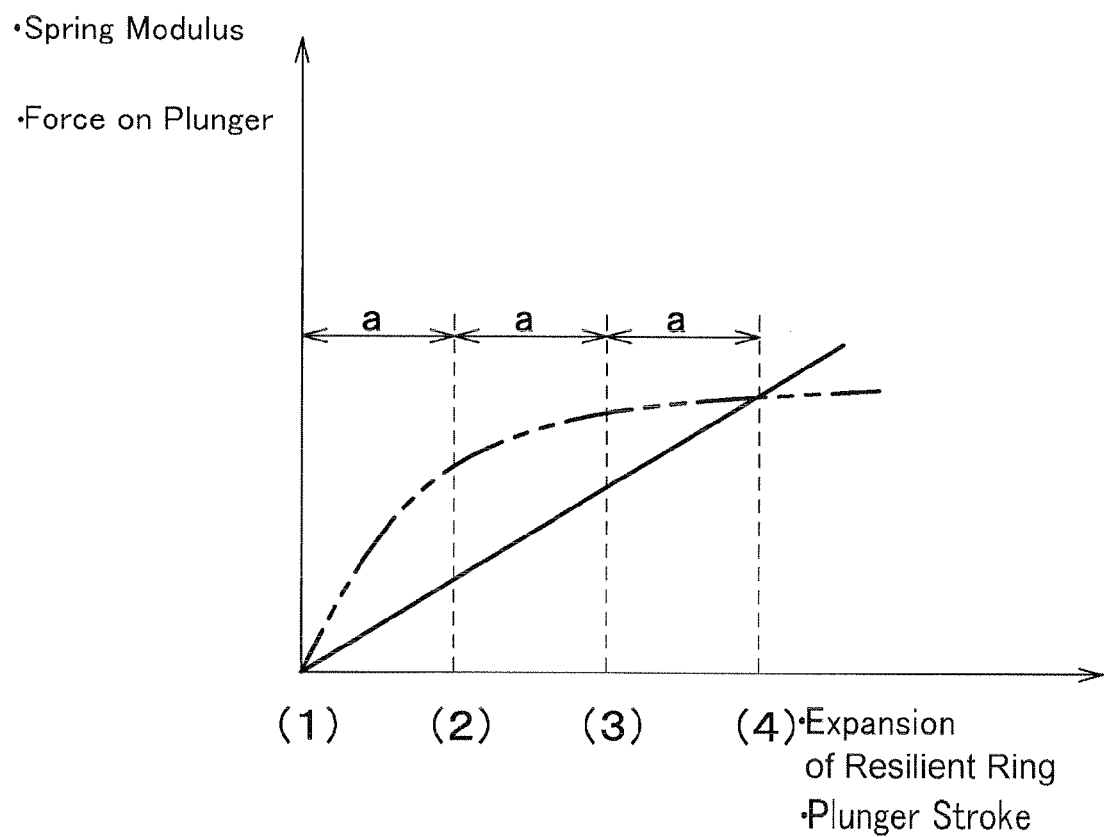
FIG. 7 is a graph illustrating the deformation characteristics of the resilient ring of FIGS. 5A and 5B.

The gradual forward facing slope of surface 122b has a convex curvature. That is, although its diameter progressively increases, proceeding in the direction of retraction of the plunger, the rate of change of its slope decreases, so that it has a bulge as shown in FIG. 6B. Because of the convexity of forward-facing surface 122b, the restriction on the protruding speed of the plunger 120 becomes more nearly constant as the C-ring 130 expands. As shown in FIG. 7, the gradually sloping, convex forward tooth surfaces 122b stabilize the speed of the advancing displacement by compensating for the increased restriction on forward displacement that would otherwise occur as a result of the spring modulus of C-ring 130.

The solid line in FIG. 7 indicates the relationship between the enlargement of the C-ring 130 and the force exerted on the plunger in the retracting direction required for such enlargement of the C-ring if the forward tooth surface were not convex, i.e., if it had a simple frusto-conical shape. The broken line in FIG. 7 line indicates the relationship between the enlargement of the C-ring and the force on the plunger required for enlargement of the C-ring in the case of a convex forward tooth surface. Reference characters a and (1), (2), (3) and (4), which indicate the degree of enlargement in FIG. 7 correspond respectively to reference characters a and (1), (2), (3) and (4) in the enlarged auxiliary view of FIG. 5B. As will be apparent from FIG. 7, because of the convex shape of the forward tooth surface, the force required to expand the C-ring begins becomes rises rapidly during the initial expansion of the C-ring between stages (1) and (2), but begins to level off so that it is nearly constant from stage (2) through stage (4).

As shown in FIG. 6B, the angle of inclination $\alpha 2$ of the forward facing surface 116$b$ of groove 116 is approximately 70° and is greater than the angle of inclination $\beta 1$ of the steep rearwardly facing tooth surface 122$a$, which is approximately 40°. The relationship of angles $\alpha 2$ and $\beta 1$ is such that the C-ring 130 does not cross over the tooth tip of a rack tooth 122 under the load exerted on the plunger 120 in the retracting direction on engine start-up, but crosses over the tooth tip under the greater load exerted on the plunger when the chain tension becomes excessive during engine operation.

The angle $\alpha 1$ of inclination the rearward facing surface 116$a$ of groove 116 is about 90° relative to the direction of plunger movement.

Figure 8:
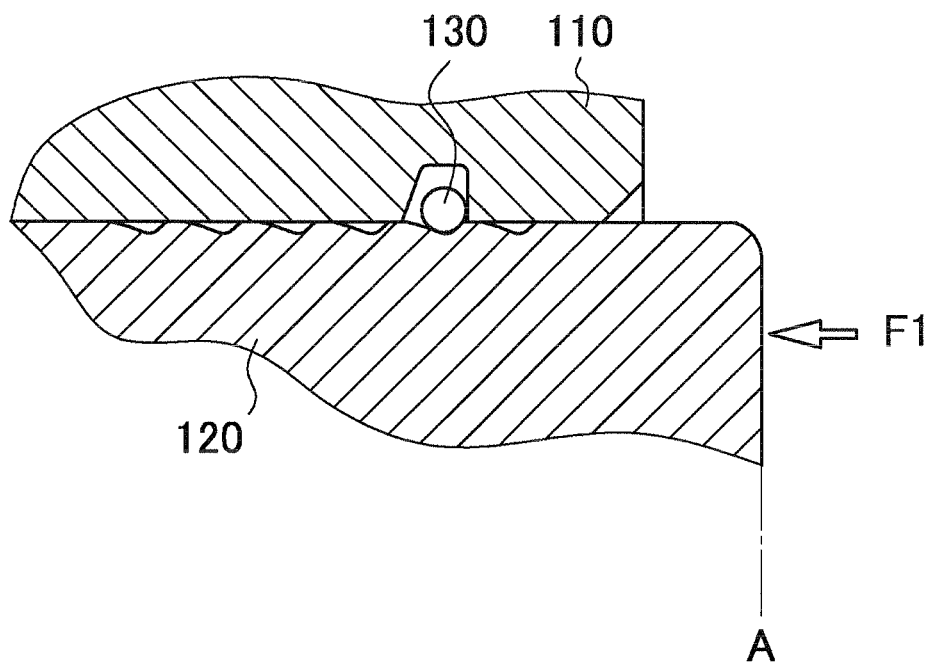
FIG. 8 is a fragmentary sectional view showing the relationship between the resilient ring and plunger of the tensioner when a load is exerted on the plunger in the retracting direction upon starting of an engine.
Figure 9:
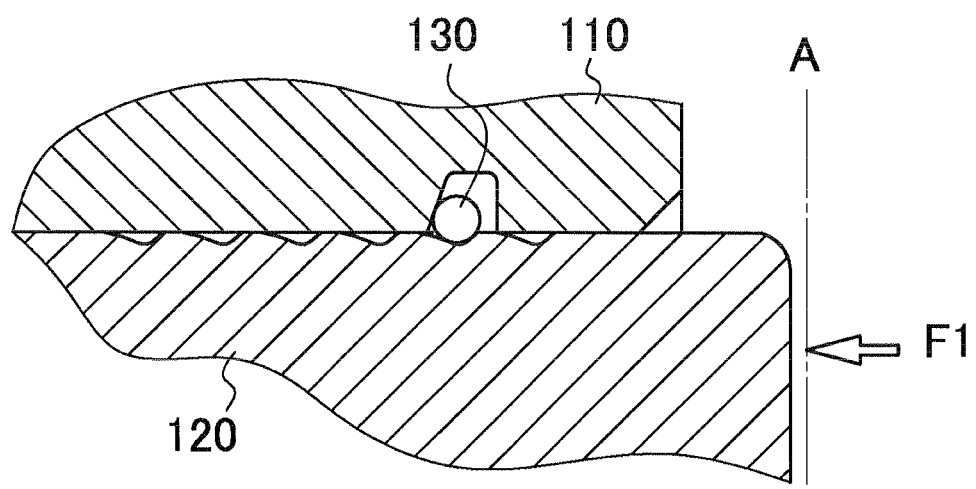
FIG. 9 is a fragmentary sectional view showing the relationship between the resilient ring and the plunger when the ratchet mechanism blocks retraction of the plunger on starting of the engine.

In the operations of the ratchet mechanism, when a load is applied to the plunger 120 in the retracting direction on engine start-up, the C-ring 130 does not expand. The plunger quickly moves a short distance in the retracting direction, as indicated by the relationship of the protruding end of the plunger to a fixed reference line A in FIGS. 8 and 9, from a condition in which the C-ring is in contact with the rearward facing groove surface and a forward facing tooth surface, to a condition in which the C-ring is in contact with a forward facing groove surface and a rearward facing tooth surface, whereupon retracting movement of the plunger stops.

Figure 10:
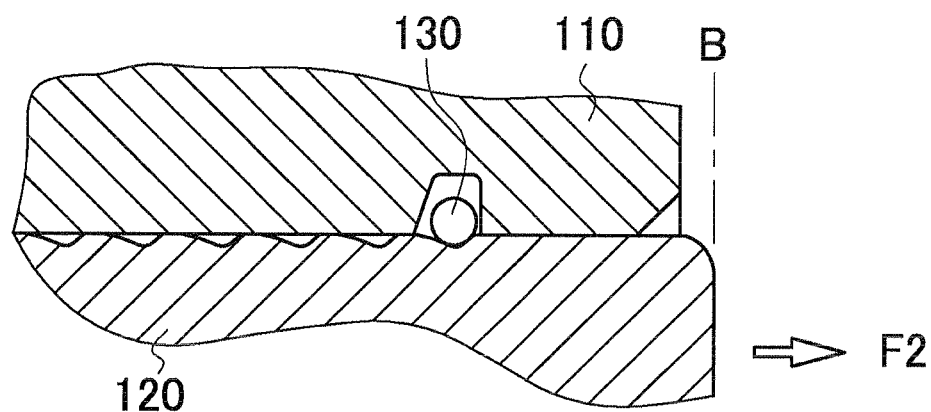
FIG. 10 is a fragmentary sectional view showing the relationship between the resilient ring and the plunger as the ring begins starts to cross over a rack tooth as the plunger advances.
Figure 11:
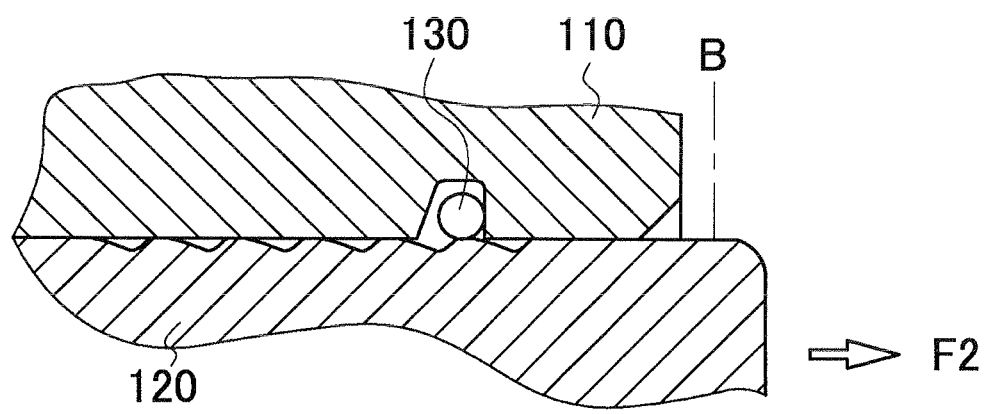
FIG. 11 is a fragmentary sectional view showing the relationship between the ring and plunger of the tensioner when the resilient ring crosses over the rack tooth as the plunger advances.
Figure 12:
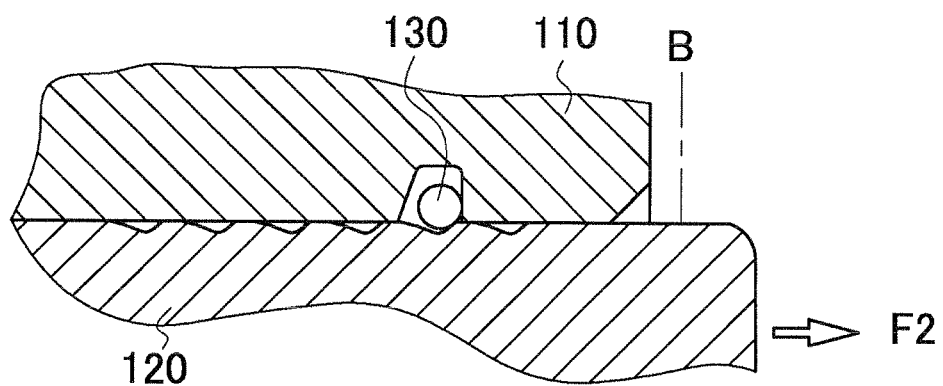
FIG. 12 is a fragmentary sectional view showing the relationship between the ring and plunger of the tensioner immediately after when the resilient ring has crossed over the rack tooth.
Figure 13:
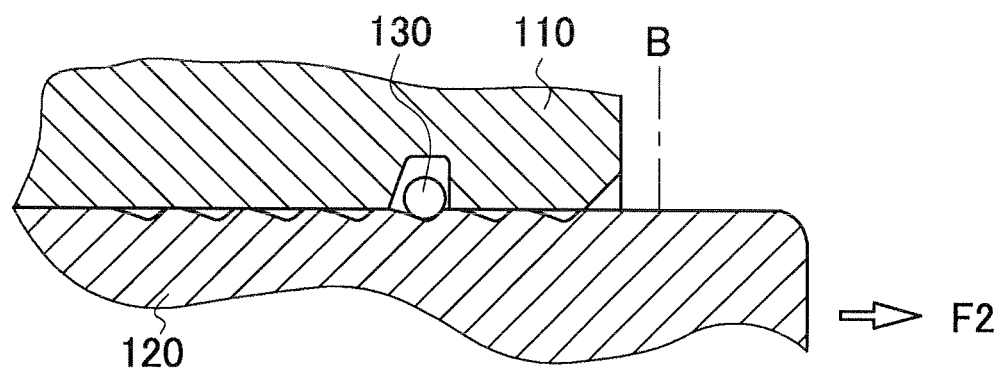
FIG. 13 is a fragmentary sectional view showing the relationship between the ring and plunger of the tensioner after resilient ring has crossed over the rack tooth and its diameter has been reduced.
Figure 14:
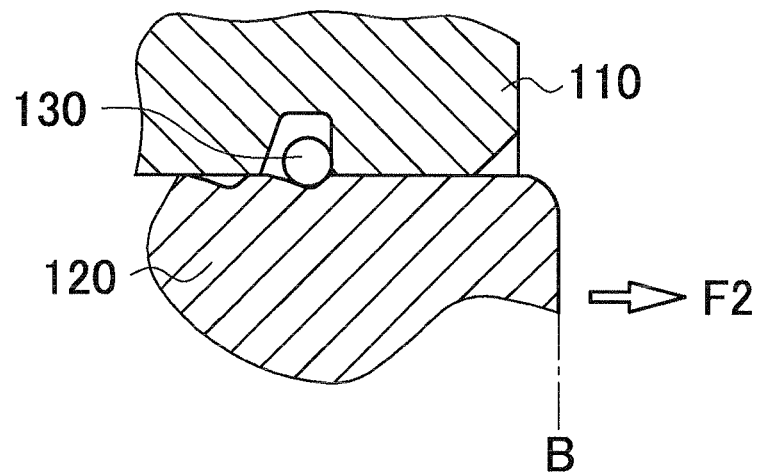
FIG. 14 is a fragmentary sectional view showing the relationship between the ring and plunger of the tensioner when immediately after the diameter of the resilient ring has started to enlarge as the plunger advances.
Figure 15:
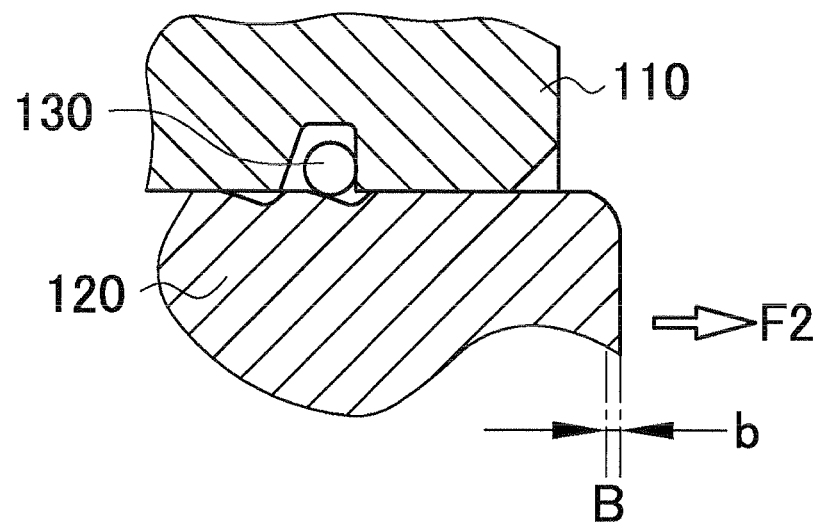
FIGS. 15, 16 and 17 are fragmentary sectional views showing successive stages of enlargement of the resilient ring when in contact with a gradually sloping forward surface of a rack during advancing movement of the plunger
Figure 16:
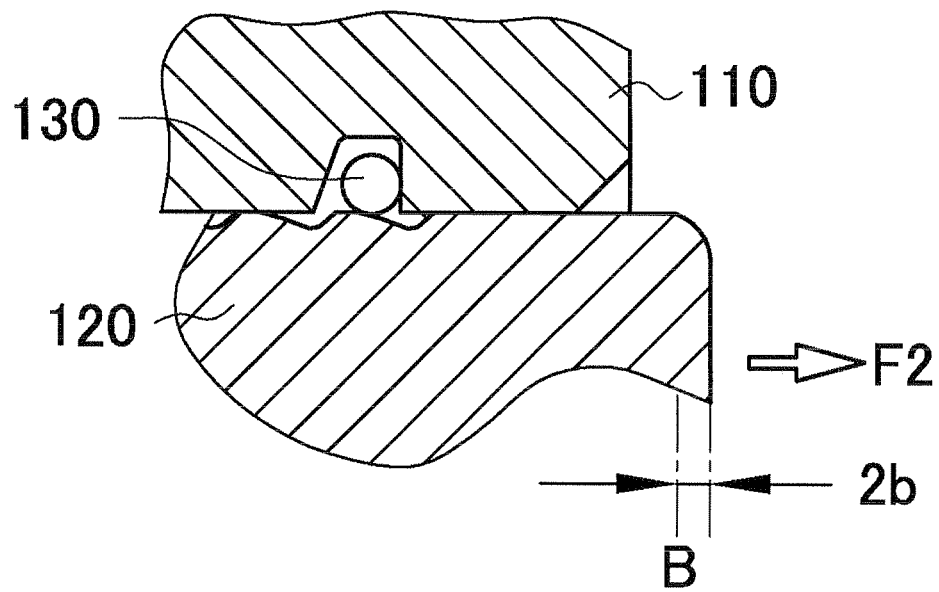
Figure 17:
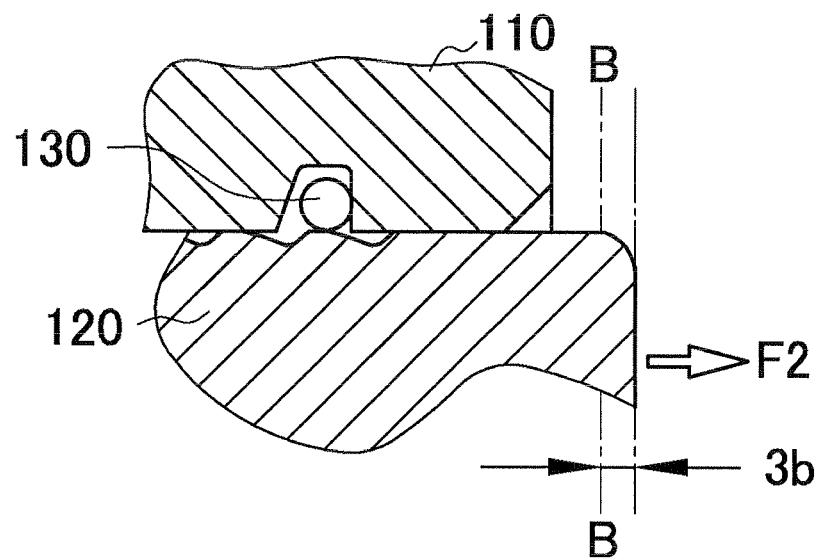

FIGS. 10 through 17 show various stages of the plunger position as the plunger advances during operation of an engine after the start-up. In FIG. 10, the C-ring 130 is in its contracted condition, and in contact both with a steep rearward facing tooth surface 122$a$ and with a gradually sloping forward facing surface of an adjacent tooth. As chain tension decreases, the plunger moves in the protruding direction, from a position in which its protruding end is aligned with reference line B. As shown in FIG. 11, the ring expands and becomes engaged with a tooth tip surface 122$c$. As the plunger continues to move in the protruding direction, the C-ring 130 crosses over the tooth tip and begins to contract while in contact with the steep rearward face of the tooth, as shown in FIG. 12. Then, as shown in FIG. 13, while the plunger continues to move in the protruding direction, the C-ring 130 further contracts and contacts both the steep rear tooth face and the gradually sloping front face of a next tooth. At this time, as the C-ring contracts, it can move away from the rearward facing surface of the groove. The plunger, being biased in the protruding direction continues to advance, applying a load F2 to the chain, so that the plunger-biasing force is balance by chain tension. Thus, tensioner maintains adequate tension in the transmission chain.

When the plunger 120 advances, the convex forward tooth surface expands the C-ring 130 with a force that approaches a nearly constant level as the ring expands, as shown in FIG. 7. The force tending to expand the spring begins to approach a constant value after the ring begins to expand from the condition shown in FIG. 14, as the ring proceeds through the conditions depicted in FIGS. 15 and 16 to the fully expanded condition depicted in FIG. 17. Because the force tending to expand the C-ring approaches a constant level as the plunger displacement proceeds through distances b, 2$b$ and 3$b$ in FIGS. 15, 16 and 17, respectively, the rate of displacement of the plunger becomes more nearly constant and the advancing movement of the plunger 120 becomes more stable.

Figure 18:
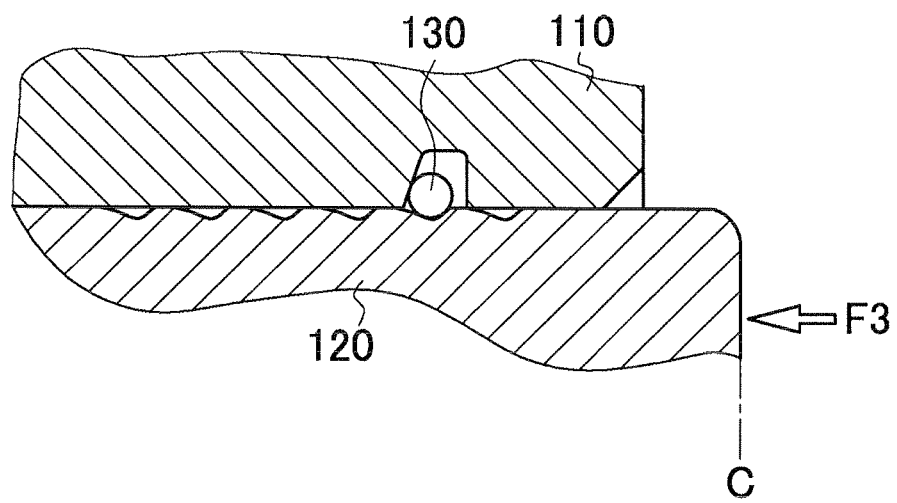
FIG. 18 is a fragmentary sectional view showing the relationship between the resilient ring and plunger of the tensioner when chain tension begins to become excessive.
Figure 19:
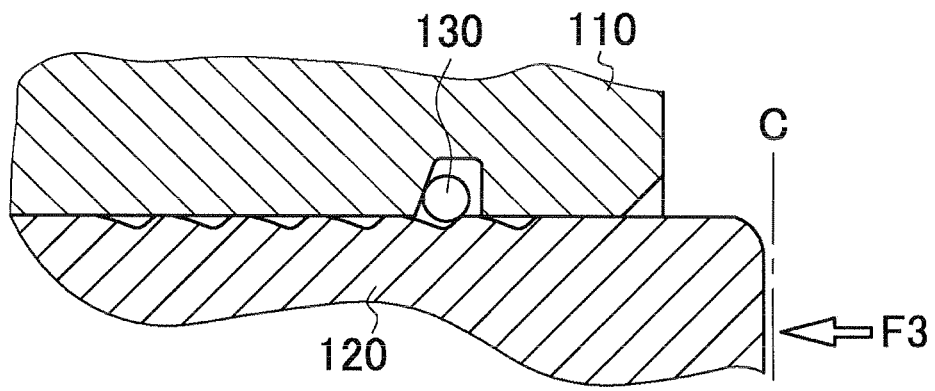
FIG. 19 is a fragmentary sectional view showing the relationship between the resilient ring and the plunger when the resilient ring begins to cross over a rack tooth as the plunger retracts.
Figure 20:
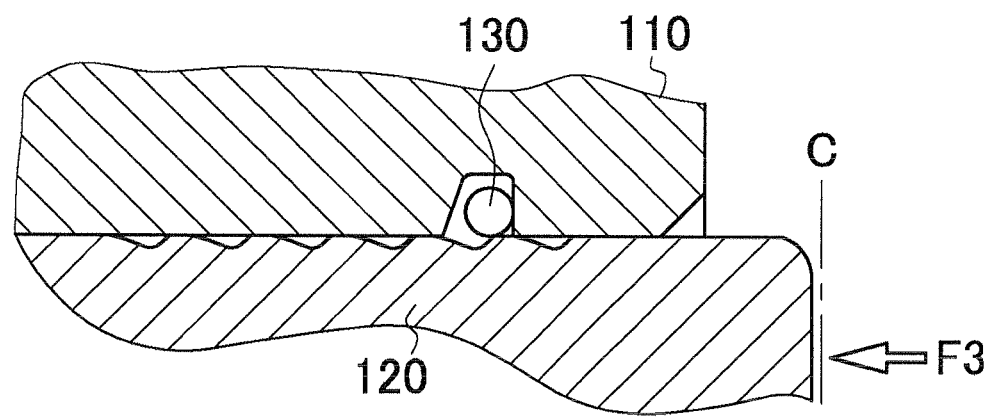
FIG. 20 is a fragmentary sectional view showing the relationship between the resilient ring and the plunger as the resilient ring crosses over the rack tooth as the plunger retracts.
Figure 21:
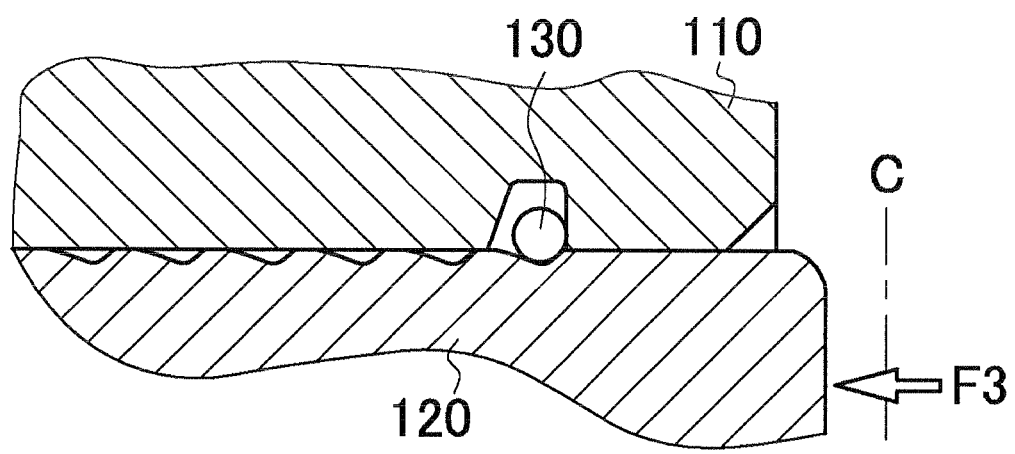
FIG. 21 a fragmentary sectional view showing the relationship between the resilient ring and plunger immediately after the resilient ring has crossed over the rack tooth as the plunger retracts.
Figure 22:
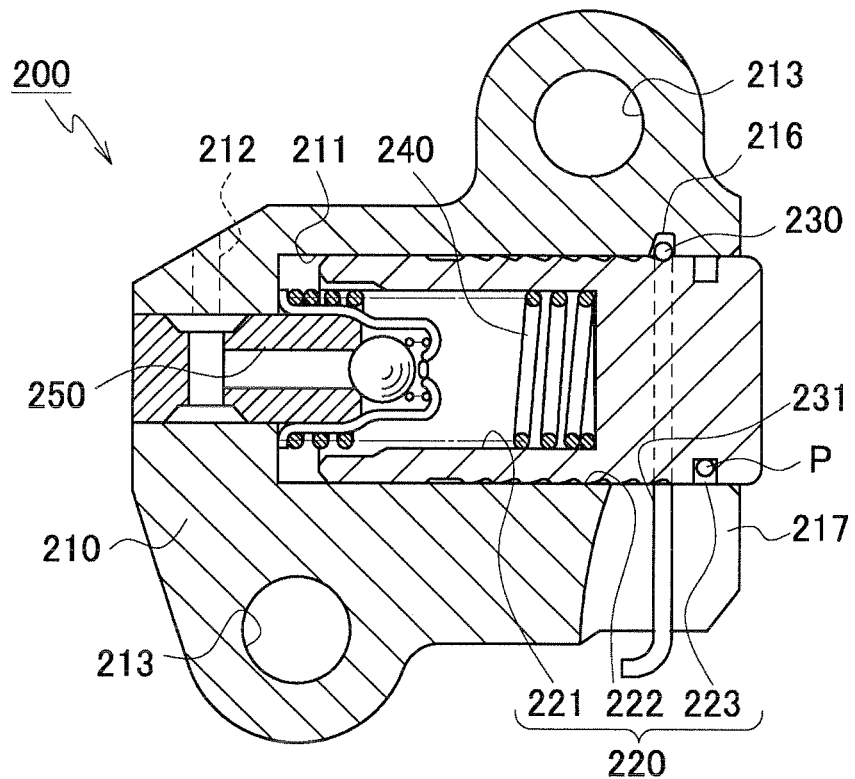
FIG. 22 is a cross-sectional view of a chain tensioner according to a second embodiment of the invention.
Figure 23:
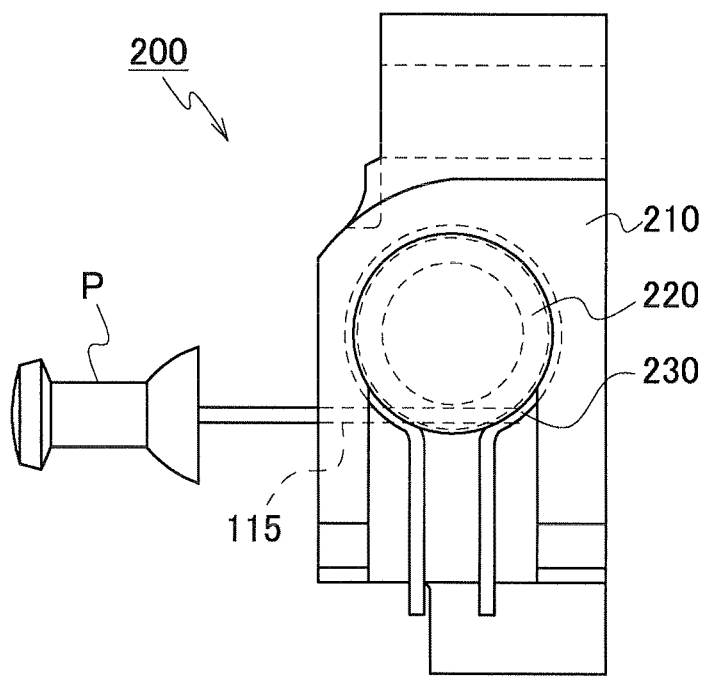
FIG. 23 is a front elevational view of the chain tensioner according to the second embodiment.
Figure 24A:
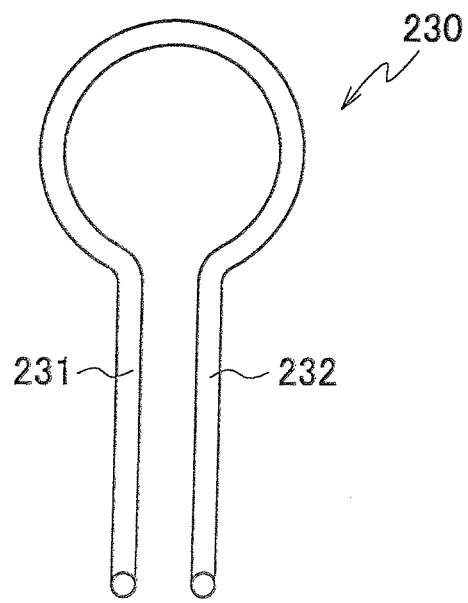
FIGS. 24A and 24B are respectively a front elevational view and a perspective view of the resilient ring used in the second embodiment.
Figure 24B:
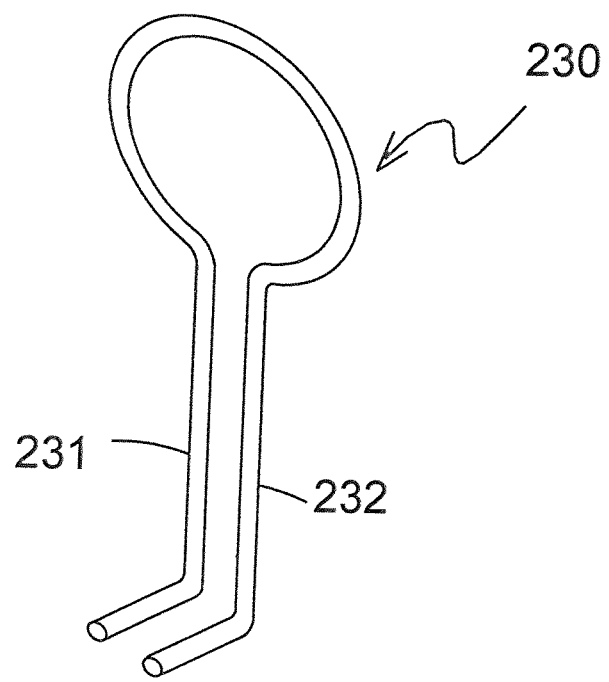

FIGS. 18 through 21 illustrate retraction of the plunger 120 relative to reference line C when the chain tension becomes excessive, applying a load F3 to the plunger in the retracting direction. The C-ring 130, which was initially in a fully contracted condition and in engagement both with a steep rear face of a tooth and with a gradually sloping forward face of a next tooth, comes into engagement with a forward facing surface of the groove as shown in FIG. 18. The C-ring then begins to expand, as shown in FIG. 19, climbing on the steep rear tooth face with which it is engaged, while separating from the gradually sloping forward face of the next tooth. As it expands, the ring is sandwiched between the rear face of a tooth and the forward facing surface of the groove in the wall of the plunger-accommodating hole. The ring, when fully expanded moves onto the tooth tip as shown in FIG. 20 and then once again contracts after passing over the tooth tip as shown in FIG. 21.

The plunger is thus allowed to move in the retracting direction when excessive chain tension is incurred during engine operation, and the retracting movement can be of sufficient magnitude that the C-ring passes over two or more rack teeth on the plunger.

The above-described structure of the rack teeth, the groove in the wall of the plunger-accommodating hole and the C-ring makes it possible to predetermine the restricting capability of the ratchet mechanism in the both the plunger-projecting and plunger-retracting directions independently by adopting appropriate inclination angles for the forward- and rearward-facing surfaces of groove 116 and the gradual and steep rack tooth faces on the plunger. Accordingly, it is possible to design the ratchet mechanism to satisfy various conditions of use, and at the same time, the simple structure of the ratchet mechanism makes it possible to reduce manufacturing costs.

Because the inclination angle of the forward facing surface 116$b$ of groove 116 (FIG. 6B) is larger than the inclination angle of the steep rear rack tooth surfaces 122$a$, it is possible to reduce the noises that are generated when chain tension becomes excessive, and to prevent seizing of the plunger.

Because the gradually sloping forward facing rack tooth surfaces 122$b$ have a convex curvature, the advancing displacement of the plunger becomes smooth and flip flop noises can be eliminated.

The use of a C-ring not only simplifies the ratchet mechanism, but also makes it unnecessary to provide a pawl that extends outside the tensioner housing. Accordingly, the tensioner housing 110 can be downsized. The C-ring can be easily selected for a predetermined resilience. Accordingly it is possible to customize the tensioner to meet any of a variety of operating conditions, while still further reducing its manufacturing costs.

In another embodiment of the tensioner, shown in FIGS. 22-24B, the structure of the tensioner is substantially the same as that of the previously described embodiment except that the specific configuration of the resilient ring is different. Reference numbers designating parts of the second embodiment exceed the reference numbers designating corresponding parts of the first embodiment by one hundred.

In tensioner 200, the ring 230 is a resilient ring composed of a circular arc-shaped portion having a gap. Lever portions 231 and 232 extend outward from the ends of the circular portion on both sides of the gap.

The tensioner housing 210 is provided with a cut out portion 217 that extends to the outside of the tensioner housing 210 from a circumferential groove 216 formed in the wall of plunger-accommodating hole 211.

The circular part of the resilient ring 230, has the same shape and function as that of C-ring 130, described above. The lever portions 231 and 232 extend through the cut out portion 217 of the housing to the outside and one or both of the lever portions 232 is L-shaped.

In this embodiment, because the lever portions extend to the outside of the housing 210, the housing is preferably designed to be fixed to an engine block in the same manner as a conventional tensioner rather than to be inserted through a wall of the engine so that a part of the housing is outside the engine while the plunger protrudes through an opening of the housing located inside the engine.

The ring 230 has many of the advantages of the C-ring 130 of the first embodiment. In addition, an operator can easily enlarge and contract the ring 230 by manipulating the lever portions 231 and 232. Consequently assembly of the tensioner and removal of the ring for replacement or maintenance of the tensioner, can be carried out easily.

In a third embodiment, shown in FIGS. 25A and 25E, a chain tensioner 300 is functionally the same as the chain tensioner 100 of the first embodiment. However, the configuration of the tensioner housing and the check valve mechanism are different. Reference numbers designating parts of the third embodiment that correspond to parts of the first embodiment exceed the reference numbers designating corresponding parts of the first embodiment by two hundred.

Reference character E in FIG. 25A designates an engine block wall through which the tensioner 300 extends, and reference character L designates a tensioner lever located inside the engine.

Expansible ring 330 is substantially the same in structure and function as C-ring 130 in the first embodiment.

The tensioner housing 310 has a threaded outer circumferential portion 318 for inserting into a threaded hole in engine block E, so that the tensioner can be mounted from outside the engine.

In this embodiment, installation of the tensioner is easier than in the case of a tensioner bolted to an engine block, and the use of the C-ring makes it possible to eliminate the laterally protruding ratchet pawl of a conventional tensioner so that the tensioner can be readily inserted into the threaded hole in wall E. In this embodiment, not only is installation simplified but the tensioner housing can be downsized significantly.

Although the chain tensioner of the invention has been explained with reference to the timing chain of an engine, the tensioner can be utilized in other mechanisms, for example to maintain tension in the chain of a balancer system or an oil pump drive. The tensioner can also be used to maintain tension in the belt of a belt transmission.

Various modifications can be made to the invention. For example although the embodiments described are hydraulic tensioners in which the plunger-biasing force is exerted both by a spring and by hydraulic pressure, advantages of the invention can be realized in embodiments in which the plunger is biased only by a spring.

Although the angle of inclination α2 of the forward facing surface 116b of groove 116 is approximately 70° in the embodiment described, in a preferred embodiment this angle can range from approximately 45° to 75°.

The angle β1 of the steeply sloping rear tooth face, which is 45 degrees in the embodiments described, is preferably in the range from 35° to 55°.

The inclination of the forward facing wall of the groove is greater than the inclination of the steep rearward facing rack tooth surfaces slope by an amount such that the resilient ring does not cross over a tooth tip portion under the load applied by the chain to the plunger on engine start-up, but can cross over one or more tooth under the load generated when chain tension becomes excessive during engine operation.

The cylindrical tooth tips are optional but contribute to smooth sliding of the plunger by reducing contact pressure between the tooth tips and the wall of the plunger-accommodating hole.

While the tensioner is preferably composed of an iron-based material such as steel or cast iron in the interest of strength, workability and low cost, various other materials can be utilized.

What is claimed is:

1. A chain tensioner for use in an engine, comprising:
a tensioner housing having a cylindrical plunger-accommodating hole having an inner peripheral surface and an opening at one end thereof;
a plunger slidable in the plunger-accommodating hole and protruding therefrom through said opening, said plunger having an outer peripheral surface, and being movable in said plunger-accommodating hole both in a protruding direction and in a retracting direction opposite to said protruding direction;
an annular circumferential groove formed in the inner peripheral surface of the plunger-accommodating hole adjacent said opening;
a resilient ring retained in said annular circumferential groove and radially expansible and contractible therein between a radially contracted condition and a radially expanded condition;
a plunger-biasing spring urging the plunger in a protruding direction; and
a plurality of annular rack teeth formed on the outer peripheral surface and spaced from one another along said protruding direction;
wherein the annular circumferential groove of the plunger-accommodating hole comprises a first ring-engaging wall facing in said retracting direction, and a second ring-engaging wall facing in said protruding direction;
wherein each rack tooth of the plunger has a steeply sloping rear side facing in the said retracting direction and a gradually sloping front side facing in said protruding direction;
wherein the resilient ring, when in its radially contracted condition can simultaneously engage a steeply sloping rear side of a rack tooth and a gradually sloping front side of an adjacent rack tooth;
wherein the angle of inclination of the second ring-engaging wall surface is greater than the angle of inclination of the steeply sloping rear sides of the rack teeth, said angles of inclination being measured relative to the protruding direction of the plunger, whereby that the resilient ring can be prevented from crossing over a tip of a rack tooth when a design load in the retracting direction is applied to the plunger on engine start-up, but can cross over the tip of a rack tooth by expansion of the ring when a load greater than said design load is applied to the plunger in the retracting direction when chain tension becomes excessive; and wherein the gradually sloping front sides of the rack teeth have a convex curvature wherein the rate of increase in their diameters with respect to the retracting direction of the plunger decreases, proceeding along the retracting direction, whereby the protruding movement of the plunger becomes more nearly linear as the resilient ring is expanded by contact with a gradually sloping front side of a rack tooth.

2. The chain tensioner according to claim 1, wherein each said rack tooth has a cylindrical tip surface having a uniform diameter interposed between its sloping front and rear sides.

3. The chain tensioner according to claim 1, wherein the resilient ring is a C-ring.

4. The chain tensioner according to claim 1, wherein the resilient ring is an annular ring provided with lever portions extending radially outward therefrom.

5. The chain tensioner according to claim 1, wherein the tensioner housing includes a threaded outer circumferential surface, whereby the tensioner can be mounted by engaging said threads with mating threads formed in an opening in a wall of an engine.

6. a chain tensioner, comprising:
- a tensioner housing in which a cylindrical plunger-accommodating hole whose one end is opened is formed;
- a cylindrical plunger slidably inserted into the plunger-accommodating hole;
- a resilient ring stored and retained in an annular circumferential groove provided around an inner peripheral surface near an open end of the plunger-accommodating hole so that a diameter thereof may be enlarged; and
- a plunger biasing spring for biasing the plunger in a direction of projecting out of the plunger-accommodating hole; characterized in that
- a ratchet mechanism is composed of a plurality of concave-convex rack teeth provided around an outer peripheral surface of the plunger along the projecting direction and the resilient ring stored and retained in the annular circumferential groove of the plunger-accommodating hole;
- the annular circumferential groove of the plunger-accommodating hole is composed of at least a projecting-side ring stopping wall surface formed on the plunger projecting direction side and a retracting-side stopping wall surface formed on the retracting direction side;
- each rack tooth of the plunger is composed of at least a projecting-side steep slope formed on the plunger projecting direction side and facing to the retracting-side stopping wall surface of the plunger-accommodating hole while interposing the resilient ring and a retracting-side moderate slope formed on the plunger retracting direction side and facing to the projecting-side ring stopping wall surface of the plunger-accommodating hole while interposing the resilient ring;
- an inclination angle in the projecting direction of the retracting-side stopping wall surface formed in the plunger-accommodating hole with respect to an inner peripheral surface of the plunger-accommodating hole is set up to be greater than an inclination angle in the projecting direction of the projecting-side steep slope formed on the rack tooth with respect to the inner peripheral surface of the plunger-accommodating hole so that the resilient ring does not cross over the tooth tip portion of the rack tooth with a load in the retracting direction generated in the plunger in starting the engine and crosses over the tooth tip portion of the rack tooth as the resilient ring is enlarged with a load in the retracting direction generated in the plunger when chain tension is excessive; and
- the retracting-side moderate slope is formed into a convex curved surface whose diameter is enlarged gradually or stepwise in the plunger retracting direction so as to restrict projecting speed of the plunger, which advances and projects as the diameter of the resilient ring is enlarged, to be constant.

\* \* \* \* \*